July 8, 1941.  C. H. NORTON  2,248,114
DOG LEASH
Filed Feb. 4, 1941
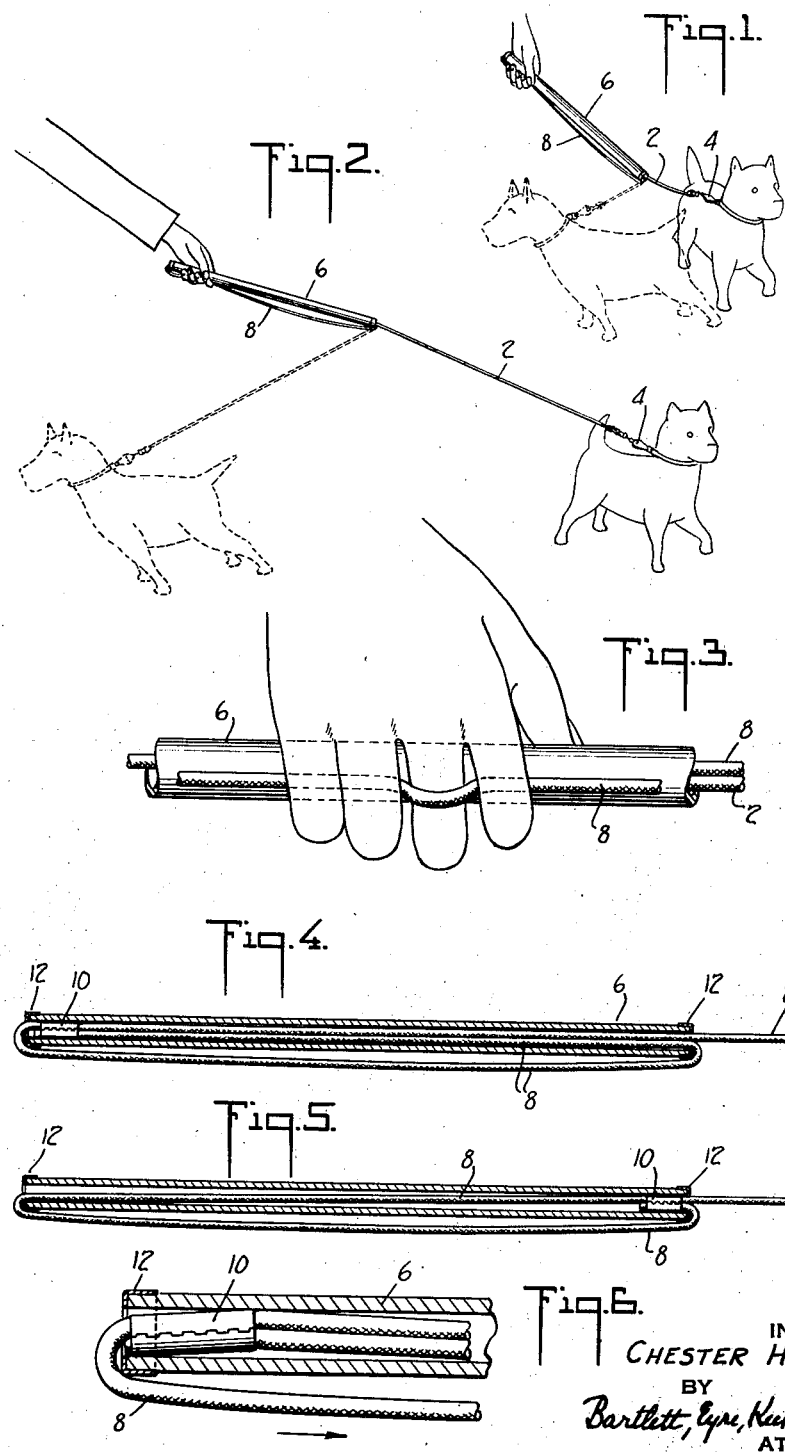
INVENTOR
CHESTER H. NORTON
BY
Bartlett, Eyre, Keel & Weymouth
ATTORNEYS Patented July 8, 1941

2,248,114

UNITED STATES PATENT OFFICE 2,248,114

DOG LEASH

Chester H. Norton, Katonah, N. Y.

Application February 4, 1941, Serial No. 377,314

5 Claims. (Cl. 119—109)

My present invention relates to dog leashes or leads and comprises a novel device of this character which is particularly suited for training puppies but which may be advantageously employed for walking or exercising dogs at any time.

A feature of the invention is the inclusion of means controlled from the wrist of the master for preventing the dog from leaning against his master's leg or from getting in front of his master's feet.

Another feature of the invention is the provision of means for varying the length of the lead.

Other features, including the relative low cost of manufacture and attractive appearance of the leash will be apparent as the description proceeds.

A preferred embodiment of the invention is illustrated in the accompanying drawing, of which:

Fig. 1 is a perspective view of a lead embodying the invention and showing its use in training a dog to walk with head up and without leaning;

Fig. 2 is a perspective view of the lead of Fig. 1 with its length extended to permit greater freedom of movement of the dog;

Fig. 3 is an enlarged view of a part of the control end of the leash, showing the method of holding the leash to the desired length;

Fig. 4 is an enlarged longitudinal sectional view of the control end of the lead, with the lead in shortened position corresponding to Fig. 1;

Fig. 5 is an enlarged longitudinal sectional view of the control end of the lead, with the lead in extended position corresponding to Fig. 2; and Fig. 6 is an enlarged sectional view of the extreme end of the lead.

As shown in the drawing, the new lead comprises a flexible cord 2 having at one end thereof a suitable catch 4, preferably of the swivel eye type shown, for connection to a dog collar, and a tube 6 of fiber, metal, or the like, which encloses one stretch of a loop 8 of the cord 2. The loop 8 is formed by suitably securing, as by a clamp 10, the end of the cord 2 to a point on the cord remote from the end slightly more than twice the length of the tube 6. With this construction the stretch of the loop 8 outside of the tube is not under tension and permits gripping by the fingers when the lead is in use, as shown best in Fig. 3.

When the lead is to be used to train the dog, the external stretch of the loop 8 is pulled toward the collar end of the leash to bring the clamp 10 to the upper part of the bore of the tube 6 and necessarily, therefore, to bring a length of the cord beyond the loop likewise within the bore of the tube 6. This position of the parts, shown in Figs. 1 and 4, gives a relatively short length of lead between the tube 6 and dog and permits the master to keep the dog close to him and to give, if desired, a direct upward pull at the collar. This prevents leaning, and teaches the dog to keep his head up. It also insures that the dog cannot get under foot as, with the stiff tube in the master's hand, complete control of the location of the dog is obtained at all times. For example, if the dog attempts to run toward the master's feet the tube 6 keeps the dog away, as shown by the dotted line position of the dog in Fig. 1.

When the lead is held, as shown in Fig. 3, with one finger between the tube 6 and the external stretch of loop 8 and the other fingers enclosing both the stretch of loop and the tube, the dog's pull cannot change the length of leash. When, however, greater length of lead is desired, relaxation of the hand grip permits the dog to extend the leash, or, the master may pull upwardly on the external stretch of the loop 8. This rotary movement of the loop brings the clamp 10 downwardly through the bore of the tube 6 and increases the length of the lead beyond the tube. In Figs. 2 and 5 the lead is illustrated as extended to its greatest length. Any length of lead intermediate the extremes illustrated in Figs. 1 and 2, is, of course, obtained in a similar manner. Even with the leash fully extended, the tube 6 prevents the dog from interfering with the master's feet as the tube in effect lengthens the master's arm. This is illustrated by the dotted line position of the dog in Fig. 2.

The tube thus provides a handy means, not only for training the dog but for steering and controlling him. It prevents him from interfering with the master's stride or with passers-by and also keeps him from winding his lead around trees or posts.

The length of the tube 6 and length of cord between the clamp 10 and the catch 4 are, of course, matters of design which depend in part upon the size of dog to be led; a relatively longer tube or greater free length of cord being preferred for a small or low backed dog than for a large or high backed dog. About 16 inches length of tube with about 20 to 25 inches of cord between the loop 8 and catch 4 are suitable lengths for medium size dogs. This gives a lead length variable from 20 or 25 inches to 36 or 41 inches, according to the adjustment of the loop 8 in the tube 6. To obtain maximum adjustment of length, the length of cord beyond the loop should, of course, be not less than the length of the tube.

In making the new leash, suitable metal ferrules 12 are first forced on the ends of the tube 6, the catch 4 is secured to one end of the cord 2 and the other end of the cord is passed through the bore of the tube. The clamp 10 is then secured, as by a die press, about the end of the cord 2 and the stretch thereof at which the loop 8 is to terminate. The clamp 10 and the parts secured together thereby are then forced into the lower end of the tube; the length of loop and the give in the cord being sufficient to permit this operation. Once the clamp 10 is within the bore of the tube 8 it remains therein unless deliberately forced out. When the clamp 10 is at the upper end of the tube, it tends to lock itself within the bore, as shown in Fig. 6. This is because the pull on the loop 8 in shortening the lead is in the direction of the arrow and not longitudinally away from the tube.

It will be apparent from the above description that the new lead is a practical and useful training lead for dogs that may be economically manufactured and that is of pleasing appearance. The tube 6 while serving the definite utilitarian purpose of controlling the position of the dog and of controlling the length of lead, also gives a swagger stick appearance to the leash that appeals to dog owners. The tube also provides a handy club which may be used for the dog's protection or discipline and this whether the dog is, or is not, secured to the leash at the moment. The tube 6 may be of any suitable material and be of any color, as is also the case with the cord 2. Because of the relative cheapness of the materials, I prefer to use a prestretched, polished cotton cord and a shellacked fiber tubing but the invention, in its broader aspects, is not concerned with the particular materials employed. The tube should be rigid enough not to flex to an appreciable extent and the cord should be substantially non-elastic so as not to stretch unduly when the dog jerks or pulls.

Leashes which I have made up with fiber tubing and with prestretched polished cotton cord and using a relatively strong and substantial catch weigh only about two and three quarter ounces each and will not break under a two-hundred pound pull.

I claim:

1. A dog leash comprising a cord securable at one end to a collar and formed into an extended loop at its other end, and a rigid tube through the bore of which extends one-half of said loop, the bore of said tube being greater than twice the diameter of the cord whereby the length of leash between the end of the tube and the collar end may be decreased or increased by moving the exposed half of the loop longitudinally of the tube to cause more or less of the cord to be drawn into the bore of the tube.

2. In a dog leash, a relatively rigid tubular member adapted to be held in the hand, and a flexible cord having one end thereof formed into an extended loop, substantially one-half of which passes through the bore of said tubular member, the rest of said cord being at least as long as said tubular member and being adapted to be drawn more or less into the bore thereof by movement of said loop relatively to said tubular member.

3. In a dog leash, the combination comprising a flexible cord and a tubular member having a bore greater than twice the diameter of said cord, one end of said cord being formed in a loop of fixed length of which one stretch passes through the bore of said tubular member with the terminus of said loop concealed therein, whereby reciprocation of the terminus of the loop along the bore of the tube varies the length of cord extending from said member.

4. A dog leash comprising in combination a flexible cord adapted to be secured at one end to a collar, a tubular member adapted to be held in the hand, said cord extending from said collar end to and through the bore of said tubular member, thence longitudinally back along the outside of said member and again into the bore of said member at the first entered end thereof, and means clamping the end of said cord within said member to the adjacent stretch of cord therein.

5. A leash according to claim 4 wherein the length of said cord between the collar end and said clamping means is at least as great as the length of said tubular member.

CHESTER H. NORTON.